Patented Feb. 20, 1951

2,542,328

UNITED STATES PATENT OFFICE 2,542,328

WATER-SOLUBLE PHTHALOCYANINES CONTAINING QUATERNARY OR TERNARY SALT GROUPS AND SYNTHESIS THEREOF

Norman Hulton Haddock and Clifford Wood, Blackley, England, assignors to Imperial Chemical Industries Limited, a corporation of Great Britain No Drawing. Application March 18, 1949, Serial No. 82,295. In Great Britain December 6, 1944

17 Claims. (Cl. 260—314.5)

The present invention relates to the manufacture of new water-soluble phthalocyanine derivatives and, more particularly, relates to phthalocyanine derivatives which contain quaternary or ternary salt groups and are green dyestuffs suitable for dyeing textile materials.

This application is a continuation-in-part of our copending application, Serial No. 632,786, filed December 4, 1945, now U. S. Patent 2,464,806.

According to the present invention, we manufacture the new water-soluble phthalocyanine derivatives from phthalocyanine compounds which carry pendant aryl nuclei attached to the phenylene nuclei of the fundamental phthalocyanine complex through linking atoms or groups of atoms and bear $n$ chloromethyl or bromomethyl groups, wherein $n$ represents a numeral greater than 1 and at least $(n-1)$ of the chloro- or bromomethyl groups are carried in the pendant aryl nuclei, by a process which comprises treating the phthalocyanine compound by known methods for replacing the chlorine or bromine atoms thereof by quaternary or ternary salt groups. The linking atoms or groups of atoms referred to above for the purposes of the present invention may be a monatomic bridging link, for example, —CO—, —S—, —O—, and —SO$_2$—.

The new water-soluble derivatives thus obtained are compounds of the formula R(CH$_2$X)$_n$, wherein R represents the molecule of a metal or metal-free phthalocyanine compound carrying pendant aryl nuclei attached to the phenylene nuclei of the fundamental phthalocyanine complex through linking atoms or groups of atoms, $n$ is a number greater than 1, at least $(n-1)$ of the —CH$_2$X radicals are carried in the pendant aryl groups, and X is a quaternary or ternary salt group.

Suitable phthalocyanine derivatives for use in the process of the present invention include, for example, copper tetra-(chloromethyl)-tetra-4-benzoyl-phthalocyanine, copper tetra-(chloromethyl) - tetra-4-(p-tolylmercapto)-phthalocyanine, and copper tetra-(chloromethyl)-tetra-4-(p-tolylsulphonyl)-phthalocyanine.

The chlorine or bromine atoms of the chloro- or bromo-methyl derivatives of phthalocyanine are replaced by quaternary or ternary salt groups as said by known means. These include, for example:

(1) Heating the chloro- or bromo-methyl derivative with a tertiary amine to convert it to a quaternary ammonium salt. Suitable tertiary amines for this purpose include, for example, pyridine, hexahydrodimethylaniline, triethylamine, and diethylaminoethyl alcohol.

(2) Causing the chloro- or bromo-methyl derivative to react with an alkali metal derivative of a mercaptan of the formula RSH wherein R may be a substituted or unsubstituted alkyl, cycloalkyl, aralkyl or aryl radical, thus replacing the chlorine or bromine atoms by RS— radicals, and then treating the so-obtained sulphide with such an ester as is known to convert sulphides into ternary sulphonium salts, for example with dimethylsulphate or methyl p-toluenesulphonate. Suitable mercaptans which may be used in this process include, for example, methyl mercaptan, n-butyl mercaptan, cyclo-hexyl mercaptan, benzyl mercaptan thiophenol and p-thiocresol.

(3) Causing the chloro- or bromo-methyl derivative to react with a thiourea so as to convert it into an isothiouronium salt. Suitable thioureas which may be used for this purpose include thiourea, N-methylthiourea, N-phenylthiourea, N:N'-dimethylthiourea, N:N-dimethylthiourea, N:N:N'-trimethylthiourea, and tetramethylthiourea.

The new phthalocyanine derivatives of this invention are soluble in water giving bright green solutions from which cotton or other textile material is dyed in bright green shades of very good fastness to washing treatments and to light. In some cases, it is advantageous to assist solution in water, for example by the addition of suitable surface tension reducing agents. We have found that condensation products of $\beta$-naphthol and ethylene oxide are particularly suitable for this purpose. It is a further feature of the invention to use these quaternary and ternary salts as dyestuffs.

The invention is illustrated but not limited by the following examples in which parts are by weight:

*Example 1*

10 parts of copper tetra-(chloromethyl)-tetra-4-benzoyl-phthalocyanine (made as described below) and 100 parts of $\beta$-ethoxyethanol are milled during 16 hours with 80 parts of coarse gravel in a bottle rotating at about 150 revolutions per minute. The fine suspension so obtained is separated from the gravel and a solution of 14.6 parts of sodium methylmercaptide in 100 parts of ethyl alcohol is added. The temperature of the mixture is raised to 100° C. during 1 hour, some of the alcohol being thereby distilled off. The bright blue suspension remaining is filtered, the residual solid is washed with ethyl alcohol and then with water. A bright blue powder is obtained which consists of copper tetra-(methylmercaptomethyl)-tetra-4-benzoylphthalocyanine.

The so obtained copper tetra-(methylmercaptomethyl)-tetra-4-benzoyl-phthalocyanine and 65 parts of dimethyl sulphate are heated together at 90° C. during 15 minutes. The mixture is then cooled and 150 parts of acetone are added and the suspended blue solid is filtered off and washed with acetone. The solid residue is dried by exposure and consists of a blue powder which is readily soluble in water giving a bright greenish-blue solution which dyes cotton in bright greenish-blue shades of excellent fastness to washing and to light.

The copper tetra-(chloromethyl)-tetra-4-benzoyl-phthalocyanine employed above may be made as follows: To 30 parts of coarsely-powdered anhydrous aluminum chloride 11 parts of anhydrous triethylamine are gradually added. The temperature of the mixture, which becomes liquid, rises during the addition to about 150° C. The mixture is stirred and allowed to cool to 60° C. and then 3.9 parts of sym-dichlorodimethyl ether are added, the temperature being kept below 70° C. The resulting grey mixture is cooled to 55° C. and stirred while 5 parts of copper tetra-4-benzoyl-phthalocyanine are added to it in portions, the temperaure being kept between 55° and 60° C. A deep brown liquid is thus obtained. This liquid is heated at 60±2° C. during 60 minutes, and it is then poured into 300 parts of water. The bright blue suspension so obtained is filtered and the blue solid is washed free from acid with water and finally washed twice with alcohol. It is then dried at 60° C. A blue powder is obtained which contains 12.2% of chlorine and consists principally of copper tetra-(chloromethyl)-tetra-4-benzoyl phthalocyanine.

Example 2

A mixture of 5 parts of copper tetra-(chloromethyl)-tetra-4-(p-tolylmercapto)phthalocyanine, (which may be made as described below), 12 parts of tetramethylthiourea and 12 parts of water are heated at 95°–100° C. for 10 minutes. The solution so obtained is cooled and diluted with 50 parts of acetone, and the precipitated solid is filtered off, washed with acetone and dried by exposure to the air. The product is a dark green powder which dissolves in water giving a yellowish-green solution. This solution dyes cotton in yellowish-green shades.

The copper tetra-(chloromethyl)-tetra-4-(p-tolylmercapto) phthalocyanine employed above is made as follows: To 30 parts of coarsely-powdered anhydrous aluminum chloride 7.5 parts of coal-tar pyridine of boiling range 115°–140° C. are gradually added. The temperature of the mixture, which becomes liquid, rises during the addition to about 150° C. The mixture is stirred and allowed to cool to 60° C. and then 6.5 parts of sym-dichlorodimethyl ether are added, the temperautre being kept below 70° C. The resulting yellow melt is cooled to 40° C. and stirred while 5 parts of copper tetra-4-(p-tolylmercapto)phthalocyanine (which may be made by heating tetra-4-chlorophthalocyanine with p-thiocresol in benzyl alcohol) are added to it in portions, the temperature being kept between 40° and 50° C. The liquid is heated at 50° C. for 30 minutes and it is then poured into 300 parts of water. The green suspension so obtained is filtered and the green solid is washed free from acid with water and finally washed twice with alcohol. It is then dried at 60° C. and 5.85 parts of a green powder are obtained, consisting principally of copper tetra-(chloromethyl)-tetra-(p-tolylmercapto)phthalocyanine.

Example 3

In place of the 5 parts of copper tetra-(chloromethyl)-tetra-4-(p-tolylmercapto)-phthalocyanine employed in Example 2 there are used 5 parts of the chloromethylated product from the interaction of copper hexadecachlorophthalocyanine with phenol described below. The product dissolves in water, giving a green solution which dyes cotton in green shades.

The chloromethylated product from the interaction of copper hexadecachloro-phthalocyanine with phenol employed above is made as follows:

A mixture of 21 parts of copper hexadecachloro-phthalocyanine and a solution of 172 parts of sodium in 280 parts of phenol is heated in a closed vessel at 225°–230° C. for 3 hours. The mixture is acidified with hydrochloric acid, and the phenol removed by steam distillation. The green suspension so obtained is filtered and the green solid is washed free from acid with water and finally washed twice with alcohol. It is then dried at 100° C. and 21 parts of a green powder are obtained, which contains 2.6% of chlorine. The product obtained is a mixture of copper phthalocyanine derivatives containing chloro, hydroxy and phenoxy substituents attached to the phenylene nuclei of the fundamental phthalocyanine complex but containing no hydrogen atoms attached directly to the phenylene nuclei of the fundamental phthalocyanine complex. 5 parts of the product are dissolved in 80 parts of methyl hydrogen sulphate and 10 parts of sym-dichlorodimethyl ether are added. The mixture is heated at 60° C. for 30 minutes and it is then poured into 200 parts of water. The green suspension so obtained is filtered and the green solid is washed free from acid with water and finally washed twice with alcohol. It is then dried at 60° C. and 6.65 parts of a green powder are obtained. The product contains 15.5% of side chain chlorine situated in the substituent chloromethyl groups.

Example 4

In place of the 5 parts of copper tetra-(chloromethyl)-tetra-4-(p-tolylmercapto)-phthalocyanine employed in Example 2 there are used 5 parts of copper tetra-(chloromethyl)-tetra-4-(p-tolylsulphonyl)-phthalocyanine (made as described below). The product is a dark blue powder which dissolves in water giving a greenish-blue solution which dyes cotton in greenish-blue shades.

The copper tetra-(chloromethyl)-tetra-4-(p-tolylsulphonyl)-phthalocyanine employed above, is made as follows:

4 parts of copper tetra-4-(p-tolylmercapto)-phthalocyanine are suspended in 20 parts of water and 4 parts of ammonium persulphate are added. 75 parts of concentrated sulphuric acid are added gradually with good stirring, keeping the temperature at 20°–25° C. The mixture is stirred at 20°–25° C. for a further 30 minutes and it is then added to 200 parts of water. The blue suspension so obtained is filtered and washed free of acid with water. It is dried at 100° C. and 3.2 parts of a blue powder are obtained. This consists principally of copper tetra-4-(p-tolylsulphonyl) phthalocyanine.

To 30 parts of coarsely-powdered aluminum chloride 7.5 parts of pyridine are added. The temperature of the mixture, which becomes liquid, rises during the addition to about 150° C. The mixture is stirred and allowed to cool to 60° C. and then 2.6 parts of sym-dichlorodimethyl ether are added, the temperature being kept below 70° C. The resulting grey mixture is cooled to 50° C. and stirred while 2 parts of copper tetra-4-(p-tolylsulphonyl)-phthalocyanine are added to it in portions, the temperature being kept between 50° C. and 60° C. The mixture is heated at 60° C. for 15 minutes and it is then poured into 300 parts of water. The blue suspension so obtained is filtered and the blue solid is washed free from acid with water and finally washed twice with alcohol. It is then dried at 60° C., and 2.3 parts of a blue powder are obtained. It consists principally of copper tetra-(chloromethyl)-tetra-4-(p-tolylsulphonyl)-phthalocyanine.

*Example 5*

10 parts of copper tetra-(chloromethyl)-tetra-4-(p-tolylmercapto)-phthalocyanine and 100 parts of pyridine are boiled with stirring for 10 minutes. The suspension so obtained is cooled and diluted with 400 parts of acetone and the green solid is filtered off, washed with acetone and dried. The product is soluble in water and the solution dyes cotton in yellowish-green shades.

The structure of the novel compounds obtained according to this invention is typified by that of the product obtained in Example 2 above:

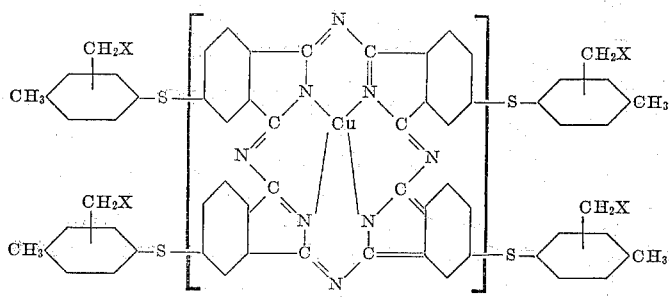

wherein X is the tetramethyl-isothiouronium chloride radical graphically represented as follows:

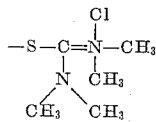

That portion of the molecule within the square brackets is the "fundamental phthalocyanine complex" referred to above and in the claims below. The benzene rings of the same are described as the "fundamental phenylene nuclei" or as the "phenylene nuclei of the fundamental phthalocyanine complex" in order to distinguish the same from the pendant phenyl groups.

In the other examples given above, the —S— linkage may be replaced by —CO—, —SO₂— or —O—, while the methylene isothiouronium salt radical is replaced by a methylene quaternary ammonium salt radical typified by —CH₂—N(C₅H₅)—Cl (the methylene pyridinium chloride radical) or by a methylene sulfonium salt radical

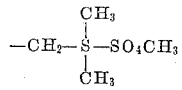

The "onium salt radical" mentioned in the claims is to be understood as embracing the salt radical attached to the CH₂ group.

It is also to be understood that the expression "quaternary ammonium" when referring to a compound or radical in the claims below is a generic phrase which includes non-cyclic ammonium salts as well as pyridinium and similar heterocyclic nitrogenous base compounds.

Having thus described our invention, what we claim as new is:

1. A phthalocyanine compound selected from the group consisting of metal-phthalocyanines and metal-free phthalocyanines which carry pendant aryl nuclei attached to the phenylene nuclei of the fundamental phthalocyanine complex through a monatomic bridging link, and characterized by bearing $n$ radicals of the type —CH₂X, wherein $n$ represents a numeral greater than 1, at least $(n-1)$ of said radicals being carried in said pendant aryl nuclei and X represents an onium salt radical selected from the group consisting of the sulfonium, isothiouronium and quaternary ammonium salts of water-soluble acids.

2. A water-soluble metal phthalocyanine compound carrying pendant aryl nuclei attached to the phenylene nuclei of the fundamental phthalocyanine complex through a monatomic bridging link, and characterized by bearing $n$ radicals of the type —CH₂X, wherein $n$ represents a numeral greater than 1, at least $(n-1)$ of said radicals being carried in said pendant aryl nuclei and X represents an onium salt radical selected from the group consisting of the sulfonium, isothiouronium and quaternary ammonium salts of water-soluble acids.

3. A phthalocyanine compound as claimed in claim 1 wherein said monatomic bridging link is

4. A phthalocyanine compound as claimed in claim 1 wherein said monatomic bridging link is —S—.

5. A phthalocyanine compound as claimed in claim 1 wherein said monatomic bridging link is —O—.

6. A phthalocyanine compound as claimed in claim 1 wherein said monatomic bridging link is

7. A copper phthalocyanine compound carrying pendant aryl nuclei attached to the phenylene nuclei of the fundamental phthalocyanine complex through a monatomic bridging link, and characterized by bearing $n$ radicals of the type —CH₂X, wherein $n$ represents a numeral greater than 1, at least $(n-1)$ of said radicals being carried in said pendant aryl nuclei and X represents an onium salt radical selected from the group consisting of the sulfonium, isothiouronium and quaternary ammonium salts of water-soluble acids.

8. A copper phthalocyanine compound carrying pendant aryl nuclei attached to the phenylene nuclei of the fundamental phthalocyanine complex through a monatomic bridging link, and characterized by bearing $n$ methylene-ternary-sulfonium salt radicals, wherein $n$ represents a numeral greater than 1, at least $(n-1)$ of said radicals being carried in said pendant aryl nuclei.

9. A copper phthalocyanine compound carrying pendant aryl nuclei attached to the phenylene nuclei of the fundamental phthalocyanine complex through a monatomic bridging link, and characterized by bearing $n$ methylene-isothiouronium halide radicals, wherein $n$ represents a numeral greater than 1, at least $(n-1)$ of said radicals being carried in said pendant aryl nuclei.

10. A copper phthalocyanine compound carrying pendant aryl nuclei attached to the phenylene nuclei of the fundamental phthalocyanine complex through a monatomic bridging link, and characterized by bearing $n$ methylene-quaternary ammonium halide radicals, wherein $n$ represents a numeral greater than 1, at least $(n-1)$ of said radicals being carried in said pendant aryl nuclei.

11. A copper phthalocyanine compound carrying pendant aryl nuclei attached to the phenylene nuclei of the fundamental phthalocyanine complex through a monatomic bridging link, and characterized by bearing $n$ methylene-pyridinium halide radicals, wherein $n$ represents a numeral greater than 1, at least $(n-1)$ of said radicals being carried in said pendant aryl nuclei.

12. Copper tetra-(methylene-tetramethyl-isothiouronium chloride) - tetra - 4 - (p - tolyl - mercapto) phthalocyanine.

13. In a process for producing water-soluble derivatives from phthalocyanine compounds which carry pendant aryl nuclei attached to the phenylene nuclei of the fundamental phthalocyanine complex through a monatomic bridging link and bear $n$ methylene halide radicals selected from the group consisting of $CH_2Cl$ and $CH_2Br$, wherein $n$ represents a numeral greater than 1, and at least $(n-1)$ of said radicals are carried in said pendant aryl nuclei, the step which comprises replacing the halide atoms of said phthalocyanine compound with an onium salt radical selected from the group consisting of the sulfonium, sothiouronium and quaternary ammonium salts of water-soluble acids.

14. A process as claimed in claim 13 wherein said phthalocyanine compound is treated with a tertiary amine to replace the halide atoms with quaternary ammonium salt radicals.

15. A process as claimed in claim 13 wherein said phthalocyanine compound is reacted with a thiourea to replace the halide radicals with isothiouronium salt radicals.

16. A process as claimed in claim 13 wherein said phthalocyanine compound is reacted with an alkali-metal salt of a mercaptan selected from the group consisting of alkyl, aralkyl and aryl mercaptans, and then subjecting the intermediate thus obtained to reaction with a methyl ester, whereby to convert the mercaptide radical into a ternary sulfonium salt radical.

17. A process for producing a water-soluble dyestuff of the phthalocyanine series which comprises reacting copper tetra-(chloromethyl)-tetra - 4 - (p - tolylmercapto) phthalocyanine with tetramethylthiourea thus producing copper tetra - (methylene - tetramethyl - isothiouronium chloride)-tetra-4-(p-tolylmercapto) phthalocyanine.

NORMAN HULTON HADDOCK.
CLIFFORD WOOD.

REFERENCES CITED

The following references are of record in the file of this patent:

UNITED STATES PATENTS

| Number | Name | Date |
|---|---|---|
| 2,479,491 | Haddock | Aug. 16, 1949 |